United States Patent
Kleineberg et al.

[11] Patent Number: 5,878,236
[45] Date of Patent: Mar. 2, 1999

[54] METHOD FOR COUPLING SEGMENTS OF A BUS SYSTEM

[75] Inventors: Michael Kleineberg, Lichtenau; Ralph Zacharias, Bad Lippspringe, both of Germany

[73] Assignee: Siemens Nixdorf Informationssysteme Aktiengesellschaft, Paderborn, Germany

[21] Appl. No.: 765,701
[22] PCT Filed: Jul. 4, 1995
[86] PCT No.: PCT/DE95/00863
§ 371 Date: Jan. 15, 1997
§ 102(e) Date: Jan. 15, 1997
[87] PCT Pub. No.: WO96/03695
PCT Pub. Date: Feb. 8, 1996

[30] Foreign Application Priority Data

Jul. 22, 1994 [DE] Germany ............... 44 26 094.6

[51] Int. Cl.⁶ .................. G06F 13/38; G06F 13/40
[52] U.S. Cl. ................. 395/308; 395/309; 370/401
[58] Field of Search ........................ 395/308, 309, 395/824, 892, 853, 200.62; 370/401, 402, 473, 912

[56] References Cited

U.S. PATENT DOCUMENTS

| | | | |
|---|---|---|---|
| 4,862,461 | 8/1989 | Blaner | 371/33 |
| 5,175,817 | 12/1992 | Adams et al. | 395/200.66 |
| 5,182,748 | 1/1993 | Sakata et al. | 370/466 |
| 5,430,720 | 7/1995 | Larsson et al. | 370/399 |
| 5,598,543 | 1/1997 | Notarianni et al. | 395/309 |
| 5,752,076 | 5/1998 | Munson | 395/825 |

FOREIGN PATENT DOCUMENTS

| | | |
|---|---|---|
| 0 348 148 | 12/1989 | European Pat. Off. |
| 0 395 416 | 10/1990 | European Pat. Off. |
| 0 545 907 | 6/1993 | European Pat. Off. |
| 0 549 217 | 6/1993 | European Pat. Off. |
| 0 566 935 | 10/1993 | European Pat. Off. |
| WO 91/13504 | 9/1991 | WIPO. |

OTHER PUBLICATIONS

American National Standard, ANSI X3.131–1986, Small Computer System Interface (SCSI), pp. 36–37;48–51; 188–191.

*Primary Examiner*—Gopal C. Ray
*Attorney, Agent, or Firm*—Hill & Simpson

[57] ABSTRACT

The method is for coupling segments of a bus system having data and control lines by transmission of bit packets with a predetermined number of bits per packet, which number is less than the sum of the data and control lines. The bit packets contain an indicator to distinguish between data packets and control packets, data packets transmitting the status of the data lines and control packets transmitting the status of control lines. A bus status is formed from the status changes of the status lines. The control packets contain an indicator which selects one of at least two transmission modes in a first transmission mode, the reception of data packets influencing only data lines, and in a second transmission mode, the reception of data packets also influencing control lines, which are defined by the respective bus status, in addition to the data lines.

10 Claims, 4 Drawing Sheets

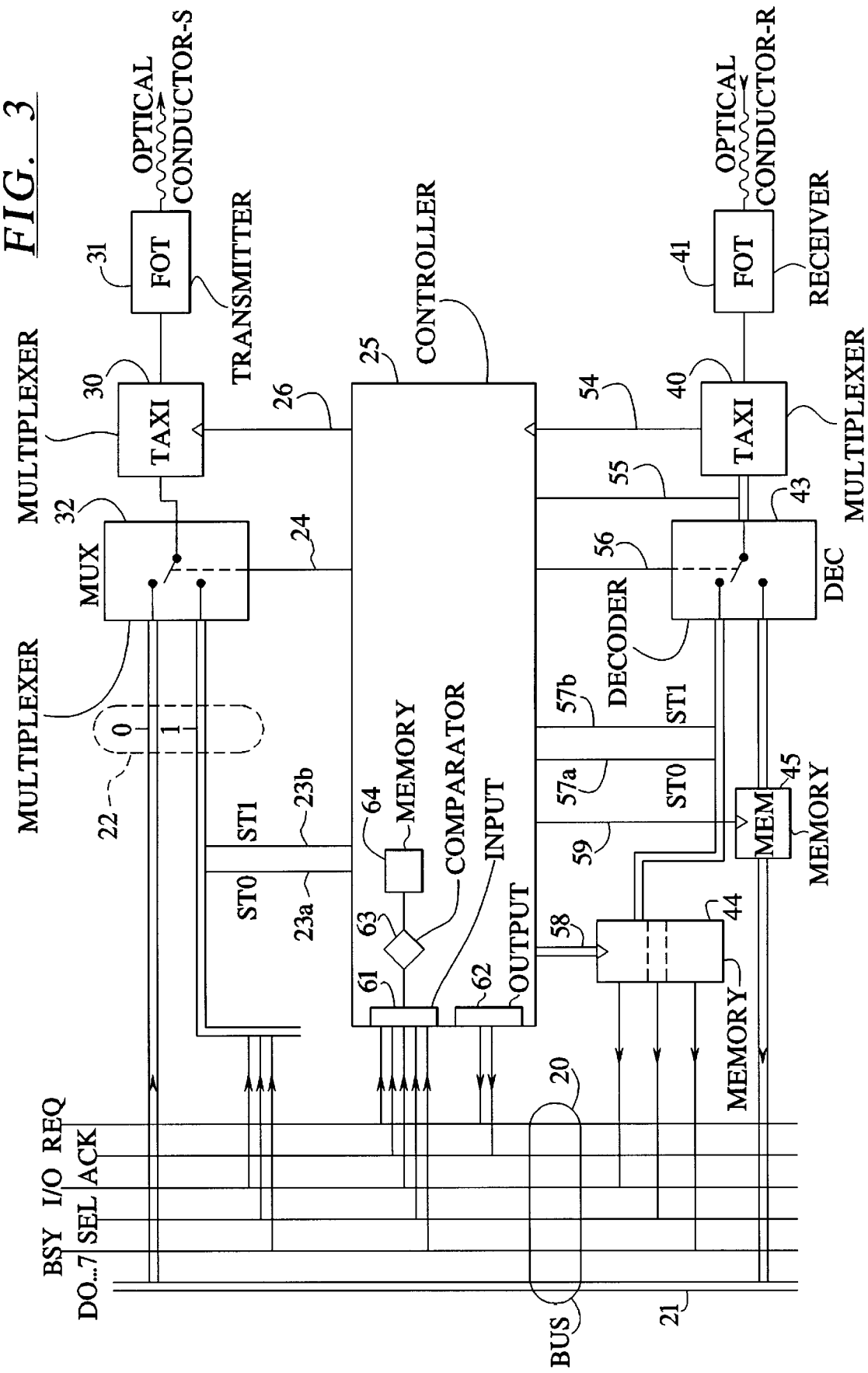

METHOD FOR COUPLING SEGMENTS OF A BUS SYSTEM

BACKGROUND OF THE INVENTION

The method relates to the coupling of bus systems via multiplex links.

Devices for linking bus systems over relatively long distances are called bus couplers. Coupling via glass-fiber links is of major importance, in particular. In this case, two bus couplers are linked to one another by a connecting path, in this case a glass-fiber line. Each bus coupler converts the signals on its bus system and transmits them via the connecting path to the other bus coupler, which acts on the bus accordingly. A bus system uses data and control lines, the data lines having valid values at times determined by the control lines. A simple bus coupler continuously monitors the control lines and, in the event of a change, transmits both the status of the data lines and the changed status of the control lines. In this case, the data transmission rate required on the glass-fiber link is governed by the number of bits and the speed, which is prescribed by the bus protocol. For example, 8 data bits, 1 parity bit and the status of 9 control lines have to be transmitted for the coupling of SCSI bus systems in accordance with ANSI X3.131. Parallel-serial converters having a length of 10 bits are suitable for this purpose. Since two changes of the control line ACK and REQ are required for the transmission of one byte, four bit packets of 10 bits are transmitted. A maximum rate of 5 Mbyte/s on the bus produces a data rate of at least 200 Mbit/s, corresponding to a signal frequency of 100 MHz on the serial link. The required bandwidth is further increased by clock information. However, the data rate of 5 Mbyte/s on the bus corresponds only to a data rate of 50 Mbit/s on the serial line, only a quarter of which can thus be utilized.

SUMMARY OF THE INVENTION

The object of the invention is to operate the bus couplers such that the data rate on the connecting line is only slightly greater than the maximum data rate which is supplied by the bus system.

The invention is based on the observation that only one specific bus status change occurs in each case in the data transfer phase. Accordingly, the transmitting link is also operated in a synchronous mode during this time, in which mode each data packet implicitly leads to activation of control lines. Data packets are likewise transmitted for the acknowledgement signals, but their contents are rejected and, instead of this, they lead to activation of a control line. The control packets can thus be dispensed with and the required bandwidth can thus be reduced to a quarter.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 3 shows a schematic circuit for an improved coupler;

DESCRIPTION OF THE PREFERRED EMBODIMENTS

Figure 1:
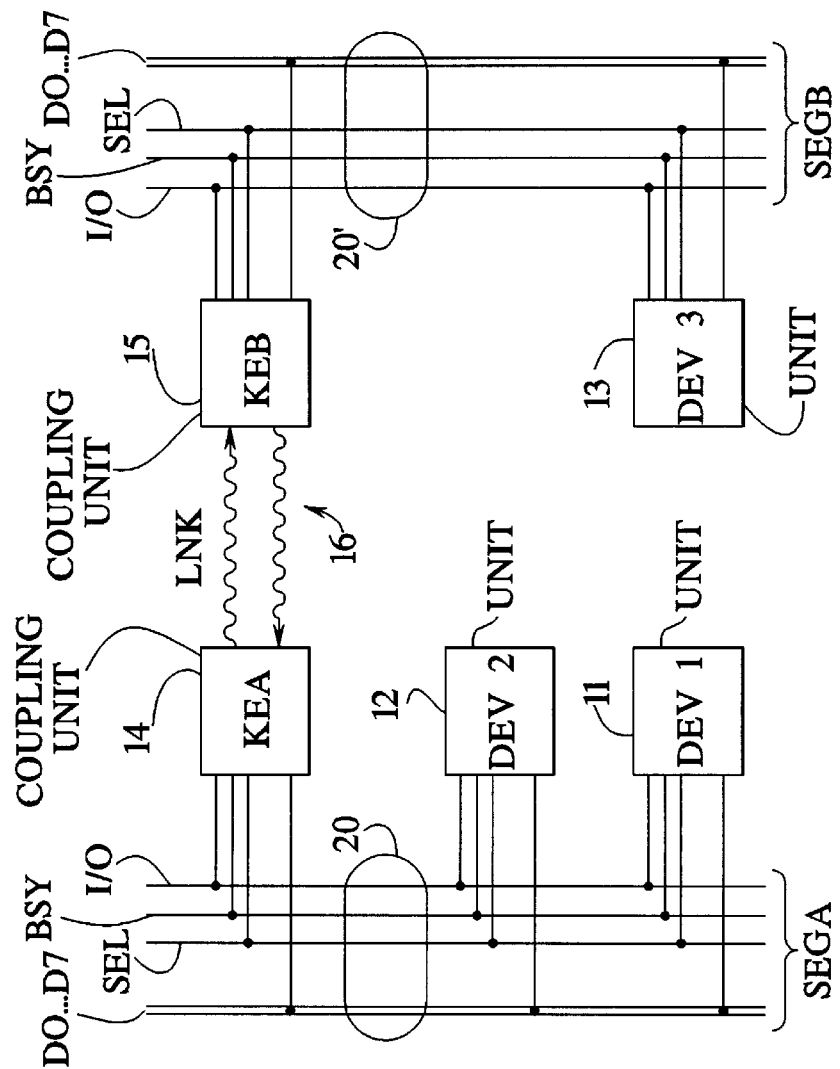
FIG. 1 shows the arrangement of two bus segments with associated couplers and three units.

FIG. 1 depicts a sketch of the structure of one bus coupling method. Two coupling units KEA 14 and KEB 15 are linked to one another via a link LNK 16. SEGA and SEGB are two bus segments 20, 20' which are coupled by the coupling units KEA and KEB. Two units DEV1 11 and DEV2 12 are connected to the segment SEGA; one unit DEV3 13 is connected to the segment SEGB. Other units are connected in a similar manner. Of the bus segments, only the data lines D0.. D7, which are important in the following text, and the control lines BSY, SEL, I/O are illustrated, as well as ACK and REQ in FIGS. 2 and 3. There are other control lines (C/D, ATN, MSG and RST), but they are not illustrated for reasons of clarity since they are not important to the sequence of the method. The "Small Computer System Interface", SCSI, corresponding to the Standard ANSI X3.131-1986 is assumed to be the bus system for the following description and is presupposed in the following description as being known. Type Am 79168 and Am 79169 serial/parallel converters, known as TAXI, from Advanced Micro Devices can be used for the link and Type V23804-E2-T5 and V23800-S2-T5, from Siemens, can be used as optical transmitters for the link.

Two units on the same segment are linked, for example, by DEV1 to DEV2, without the couplers KEA and KEB being required for transmission of the wanted data. In order to achieve a transparent coupling, transmission is nevertheless carried out on the uninvolved bus. A link between the segments, for example from DEV1 to DEV3, requires the couplers for the transmission of the wanted data.

The SCSI-1 bus can operate up to eight different units to which one of the eight data lines D0..D7 is assigned during the bus assignment, also called arbitration. The data lines are operated by drivers having an open collector so that a hard-wired OR operation takes place and is permissible on the signals on the bus. Possible additional data lines for parity bits are not used in this example.

Control lines BSY, SEL, I/O, ACK and REQ are also present. All, or at least the signals BSY and SEL, are operated via drivers having an open collector in a hard-wired OR operation. The control lines can assume the two digital statuses L or "negated" and H or "asserted". The change from L to H is called activation, and that from H to L is called deactivation. The various permissible combinations of control line statuses are called bus statuses.

Figure 2:
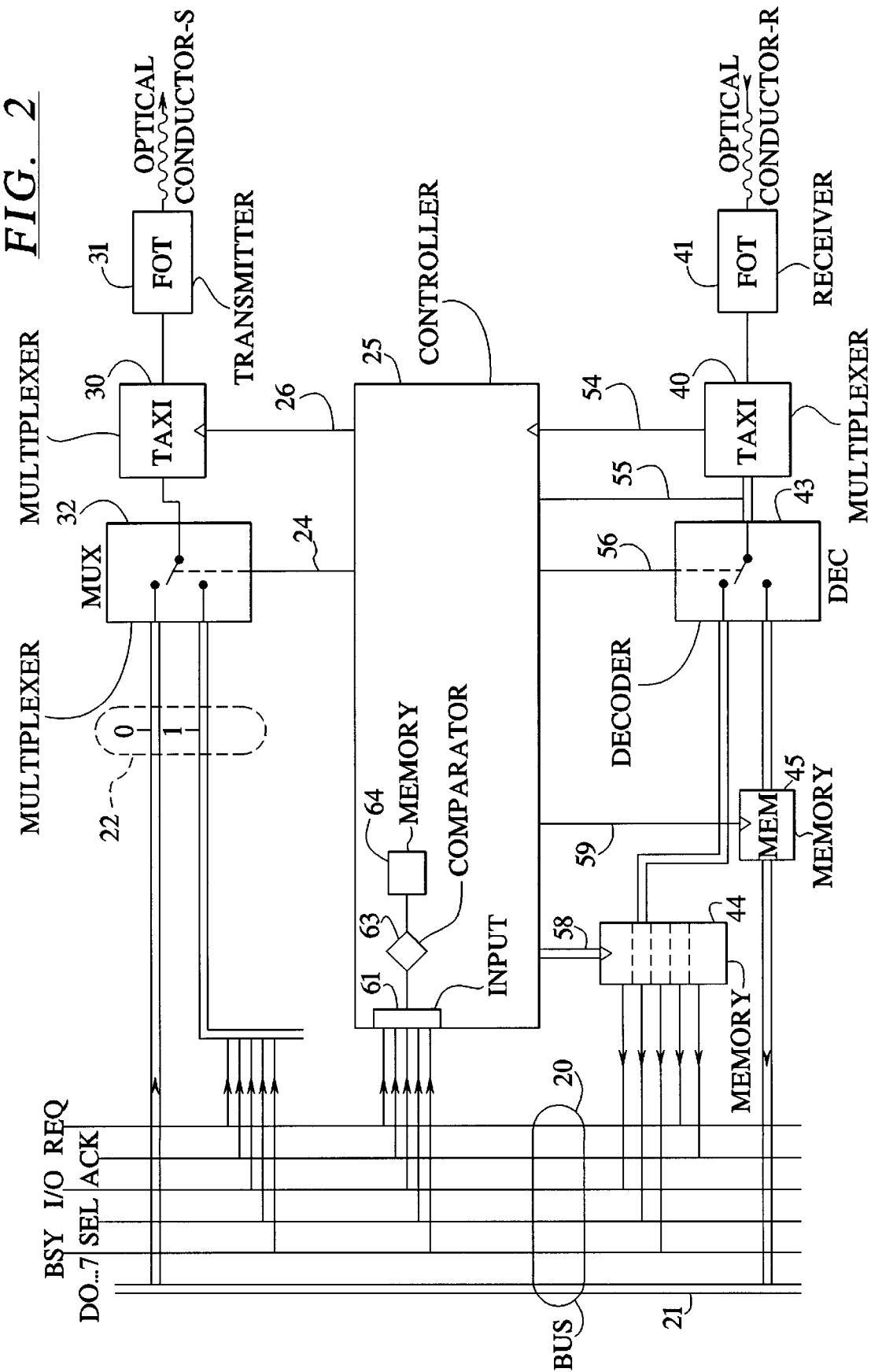
FIG. 2 shows a schematic circuit for a simple coupler.

FIG. 2 illustrates schematically the construction of a first embodiment of one of the two coupling units, which are of identical construction. The bus 20 comprises the data lines and control lines. The data lines 21 are passed to a multiplexer 32 which is controlled by a controller 25. The multiplexer has a length of 10 bits. For the transmission of data, these are connected to the 8 data bits and, possibly, to a ninth bit as a parity bit. The most significant bit is set to 0. The setting of the most significant bit to 0 is illustrated as bit supply 22. The output of the multiplexer is connected to a serialization multiplexer 30, which is called a TAXI. The data are transferred by a strobe signal 26 from the controller and are passed in serial form via the fiber-optic transmitter 31 to the optical conductor LWL-S. As an alternative to the transmission of the data bytes D0..7, the controller 25 can connect the multiplexer 32 via the link 24, for the transmission of status information as well. For this purpose, the most significant bit, which is set to 0 during data transfer, is set to 1, as is indicated in the bit supply 22. The remaining 7 bits have the control lines which are shown and those which are not shown applied to them. The controller is furthermore connected by the input block 61 to all the status lines, and can read their status.

For reception of the data which arrive via the second optical conductor LWL-R, the electrical signal provided from the fiber-optic receiver 41 is decoded by the receiving TAXI 40. The latter sends a signal via the link 54 to the controller 25 when a packet has been received and is ready at the outputs. The most significant bit is read directly by the controller 25, via the link 55. Since data packets have a 0 and control packets a 1 as the most significant bit, the controller 25 can first of all determine the type of a data packet after it has arrived. The controller 25 accordingly connects the decoder 43 via the link 56 in such a manner that the data packets pass to the memory 45 and control packets to the memory 44. The data memory 45 is designed such that the data are transferred and stored by activation of the link 59 and are also applied to the bus for the duration of the signal on the link 59. The deactivation of the link 59 can thus release the data lines which can thus be set by a subscriber on the bus. The link 58 is designed in a corresponding manner such that, for example, only the respectively required status lines are set from the memory 44 by a mask, this mask being defined in the control unit.

In the comparator 63, the controller continuously compares the status of the control lines of the bus segment 20 connected to it with an internally stored previous status 64, so that changes are identified. When a change occurs, then a data packet is sent first, and then a control packet, in the manner described. The current bus status is then stored in the memory 64 in order to identify further bus status changes. On reception of a data packet, it is stored in the memory 45. A control packet is stored in a corresponding manner in the memory 44. The data are connected to the bus in both cases. When a control packet is received, inhibitors ensure that the change in the bus status does not lead to a transfer, but is merely stored in the memory 64.

In order to activate the status memory 44 and the data memory 45 correctly, the control unit has a memory, which is not illustrated, to determine whether a target or an initiator is active on the connected bus segment. Arbitration is started by activation of the signal BSY. Subsequent evaluation of the signal SEL together with the signal I/O is used to determine which of the subscribers defined by the arbitration and subsequent selection is an initiator and which is a target. The details of this can be found in the Standard. At the same time, account is taken of whether the signals BSY and SEL have been activated by a bus subscriber or have been set as the result of a received control packet by the coupling unit. If there is a target on the bus segment, then the mask for the memory 44 is set so that the signal ACK is acted on by the coupling unit and the signals REQ and I/O are determined by the target. The relationships are inverted in the case of an initiator on the bus segment. If a target is active, then an active signal I/O means that the target is transmitting; the memory 45 is accordingly not activated via the link 59 from the coupling unit, even when data packets arrive.

Two modes are provided in the SCSI protocol for data transfer, the asynchronous mode and the synchronous mode. The control lines ACK and REQ are used for the acknowledgement signals in this case, the initiator always connecting the signal ACK and the target the signal REQ. In the event of a data transfer designated as an input from the target to the initiator, the target uses the signal REQ as a transfer signal, and the initiator uses the signal ACK as an acknowledgement signal. In the case of a data transfer designated as an output from the initiator to the target, the initiator uses the signal ACK as a transfer signal, and the target uses the signal REQ as an acknowledgement signal. The control line I/0 determines the transmission direction. In the method, which is designated as being asynchronous, the respective transmitter applies the byte to be transmitted to the data lines and activates its transfer signal. The receiver accepts the data and activates its acknowledgement signal. The transmitter and receiver then take back the transfer signal and the acknowledgement signal and repeat the steps for the transmission of the next byte. A coupling unit in this first embodiment identifies each change of REQ and ACK and transmits the data as well as the new allocation of the control lines. Thus, for the transmission of one byte, two data packets and two control packets are transmitted in the direction from the transmitter to the receiver, and the same number and type are transmitted in the direction from the receiver to the transmitter.

In the mode which is called synchronous, the parameters are set in a preliminary phase. These parameters define the buffer size in the receiver, for example 512 bytes, and the minimum separation between two transmission steps, for example 200 ns. The transmitter applies its data to the data bus, activates its transfer signal and deactivates it again without having to wait for the associated acknowledgement signal. This process can be repeated by the transmitter at the maximum frequency predetermined by the minimum separation between transmission steps, provided the number of transmitted bytes which are still to be acknowledged does not exceed the agreed buffer size. The receiver activates the acknowledgement line for each received byte as soon as it has space free in the receiving buffer again.

In the asynchronous case, any delay resulting from a narrow bandwidth for the transmission on the optical conductor is not significant since the coupling units do not become active again until after completion of the respective transmission. However, in the synchronous case, the transmission line must be designed such that all the packets can also be transmitted within the maximum permissible cycle time agreed by the subscribers, since the transmitter does not wait for acknowledgement signals. Since four packets are sent per byte, a transmission rate of 200 Mbit/s is required for a 5 Mbyte/s link. Redundant data packets may be suppressed. Because of the support of both asynchronous transmission and synchronous transmission, without the coupling unit having to identify this operating mode, the activation and deactivation of the control signals REQ and ACK have to be transmitted as control packets, however, so that three packets still have to be transmitted per byte, that is to say only a third of the bandwidth is utilized.

A second embodiment achieves a narrower required bandwidth in the synchronous mode and an increased throughput with respect to the bandwidth in the asynchronous mode in that the signals ACK and REQ are not transmitted like the other control signals by a control packet. Instead of this, the arrival of a data packet is used to activate the transfer signal. In this case, the method is intended to be designed such that the sequence takes place independently of the synchronous or asynchronous mode. The method, which is also called "handshake", therefore has to be retained in asynchronous use, in the case of which level changes from ACK and REQ are initiated by level changes on the respectively other line. However, in the synchronous mode, the level changes are in each case independent of one another.

A coupling unit circuit which differs from that of the first embodiment is used for this purpose, as is illustrated in FIG. 3. The signals ACK and REQ are not transmitted as part of a status packet. Instead of this, the bits which are available for this purpose are replaced by a subset of the bus status, which subset is coded using two bits which are supplied as ST0 and ST1 via the links 23a and 23b to the multiplexer. At the receiving end, these signals are transferred into the coupling unit via the links 57a and 57b; the corresponding parts of the memory 44 are omitted. For this purpose, the signals ACK and REQ are connected by the output circuit 62 of the controller 25 directly to the bus, it being possible to connect the two signals independently of one another.

Figure 4:
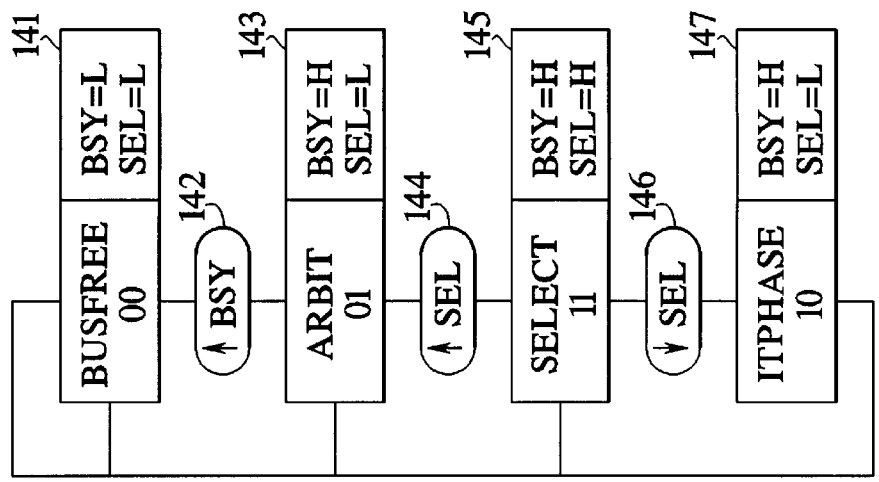
FIG. 4 shows a status diagram for the partial status to be transmitted.

The statuses which are coded in bits ST0 and ST1 are determined by a sequence which is illustrated in FIG. 4. The status BUSFREE is designated statically by inactive BSY and inactive SEL, that is to say the status BUSFREE is always assumed in this combination independently of the preliminary status, and a control packet having the status code 00 is sent. The arbitration is initiated by activation of BSY. At the same time, the initiator/target determination is started in the coupling unit. That coupling unit in which the status change after ARBIT has taken place by a bus activity has the initiator on its bus segment until the next BUSFREE. That coupling unit which changes the bus segment from the BUSFREE status to the ARBIT status on the basis of a transmitted control packet has the target. On completion of the arbitration, the addressing phase SEL starts in that the initiator activates the signal SEL and activates the data line assigned to the desired subscriber. This addressing is acknowledged in that the initiator deactivates the signal BSY while maintaining SEL. The addressed target acknowledges the selection in that, for its part, it activates BSY again. This step is omitted in FIG. 4, for the sake of clarity. The SCSI protocol furthermore provides that, when the target starts the bus allocation and thus temporarily appears as an initiator, this case is signaled by activation of the I/0 line and a role exchange takes place in a corresponding manner. After completion of the addressing phase, SELECT in each case confirms the bus segment on which the initiator is present and that on which the target is present. The data transfer phase ITPHASE, which is designated by the code 10, is initiated by deactivation of SEL. The signals ACK and REQ are significant only in the data transfer phase; furthermore, the implicit generation of ACK and REQ to be described takes place only in the data transfer phase.

Figure 5:
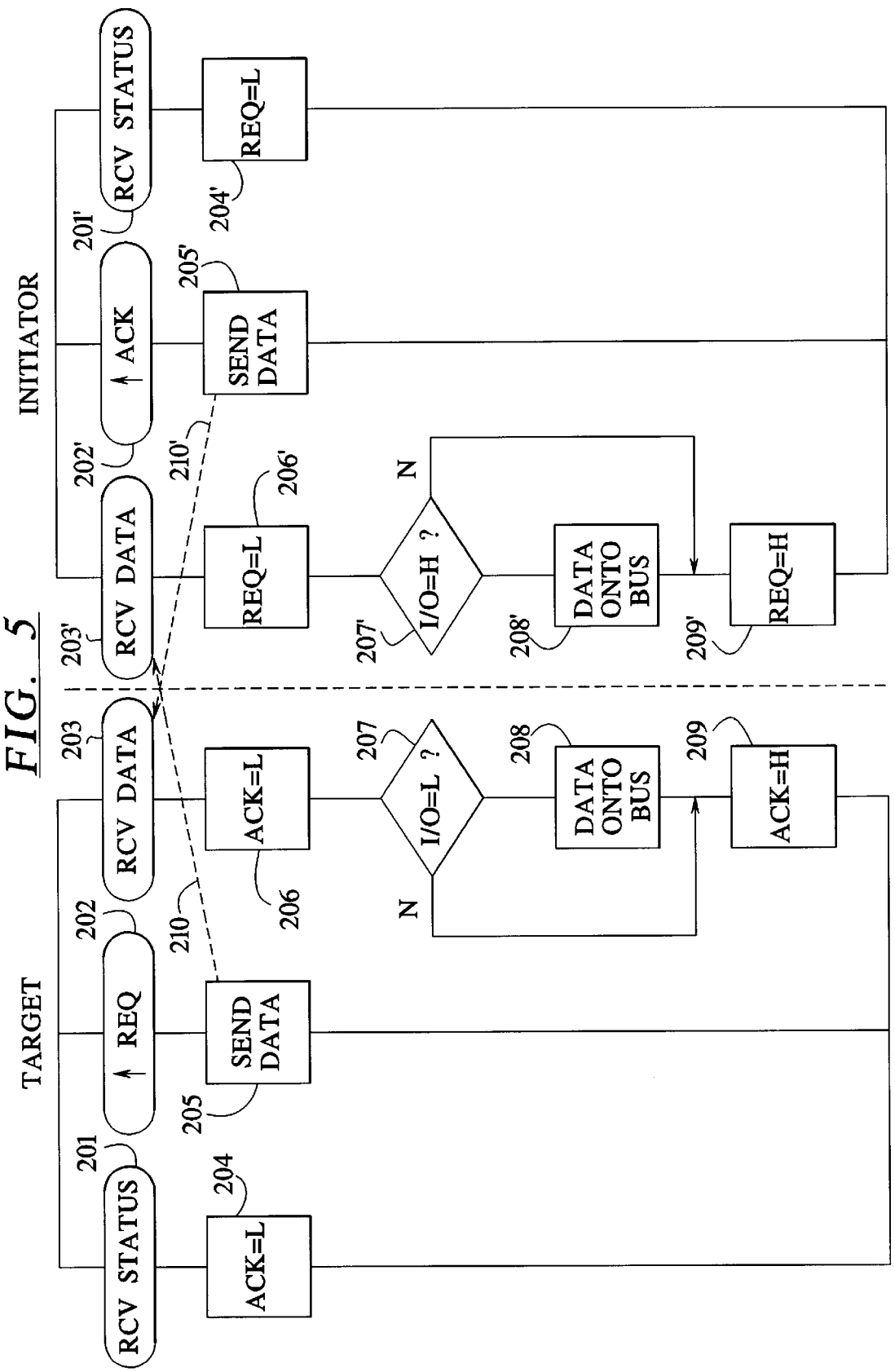
FIG. 5 shows a flow chart for the data transfer phase.

The behavior of the target and initiator in the data transfer phase is sketched in FIG. 5. The mirror-image behavior can be seen immediately. This means that the sequence is the same in both coupling units and only the data values are selected differently, depending on whether the initiator or the target is active on the bus segment, which, as a result of the multiplexer, is simple and can be accomplished without any time loss in the sequence.

It is now assumed that the target sends a byte in the asynchronous mode. In doing so, it sets the signal I/0, which leads to transmission of a control packet. Furthermore, the data to be transmitted are applied to the bus. If these signals are stable, then the target activates the signal REQ. This change is identified as step 202 and leads to a data packet being sent. No control packet is sent. This is indicated by the dotted arrow 210. The coupling unit receives the data on the part of the initiator by step 203'. The step 206' initially has no effect since REQ has already been deactivated in advance. Since I/0 is active, the question 207 leads to the received data being connected to the bus in step 208'. Subsequently, the signal REQ is activated and a wait starts until the next event. This comprises the initiator activating the signal ACK, which is identified by the coupling unit as step 202' and leads to transmission of the current data on the data bus to the coupling unit of the target. These data are the same as those just received and thus, in principle, are redundant. They are used only for signaling that the signal ACK has been set. The coupling unit of the target receives these data in step 203. Step 206 likewise initially has no effect, since ACK is already inactive. Since I/0 is active, step 208 is not carried out. Subsequently, the signal ACK is activated in step 209. As a reaction, the target deactivates the signal REQ. This status change causes the coupling unit to send a control packet without a data packet after a waiting time (not illustrated in FIG. 5) which will be explained further below. The contents of this control packet are sent unchanged with respect to the last; its arrival leads in step 201' to the signal REQ being deactivated in step 204'. The initiator then takes back the signal ACK which, in the same manner, leads to transmission of a redundant status, which deactivates the signal ACK, as step 201 and 204, on the bus segment of the target. Instead of a redundant control packet, an additional TAXI multiplexer data path, called "command" can also be used, which provides an additional "out-of-band" signal path and is already decoded in the TAXI as such. Transmission in the opposite direction is carried out in a corresponding manner.

The steps 206 and 206', which have been redundant until now, act in the synchronous mode. A transmission in the synchronous mode from the target to the initiator starts after the parameters have been dealt with by setting I/0. After this, the data lines are acted on and REQ is activated, which leads to the data being sent. However, the target does not wait for the activation of ACK but deactivates the signal REQ within the initialized time, changes the data and sets the signal REQ again after the initialized time. The coupling unit identifies the deactivation of REQ and starts a predetermined waiting time, which is in the order of magnitude of the transmission time for a packet via the transmission line. If another activation of REQ takes place within this waiting time, then the changed data are sent in step 205 and the deactivation of REQ is ignored. When these data arrive, step 206' now becomes effective, since REQ was set such that it is still active. Step 206' deactivates the signal REQ, at which point the data are applied to the bus (step 208') and REQ is activated once again (step 209'). The activations of the ACK signals on the part of the initiator are identified in step 202' in the same way and lead to the transmission of in each case one data packet, which initially deactivates ACK in step 206, and activates ACK once again in step 209. In doing so, a minimum waiting time must be maintained, which can be achieved easily in the case of a clocked switching mechanism in the controller and can likewise be achieved by pulse formers or monostable multivibrators.

However, if no renewed activation of REQ is identified during the waiting time after deactivation of REQ, then a control packet is emitted which is identical to the control packet last emitted. The reception of any control packet resets the signal REQ in the receiver, as a result of which the deactivation of REQ on the part of the target was transmitted to the initiator.

In the opposite transmitting direction, which is identified by the signal I/0, the output of the contents of the data packet to the bus is suppressed only at the end identified by I/0. The control signals are dealt with as before; a different sequence is brought about only as a result of the different behavior of the target and initiator, in that ACK is activated before REQ.

The essential feature in this case is that the deactivation of REQ and ACK does not lead to a redundant control packet.

This is achieved by a latency or waiting time which is essentially equal to the transmission time for a packet on the link. If the signal REQ or ACK is activated once again within this latency time, then the transmission of the redundant control packet is suppressed, and the data packet is used as implicit information, instead of this. Thus, as long as the transmitter is operating in the synchronous mode close to the bandwidth of the transmission line, the signals REQ and ACK are transmitted implicitly via the data packets. If the transmitter is transmitting considerably more slowly, then additional control packets are inserted, which cause deactivation of REQ and ACK. The coupling method thus acts in an unchanged manner for the synchronous mode and the asynchronous mode, without the coupling unit having to take account of these modes, and nevertheless achieves virtually the full bandwidth of the link.

The presentation so far has used the SCSI-1 bus system with a data length of 8 bits. Transmission on the 16-bit SCSI-2 bus system in accordance with ANSI X3T9.2885D is easily possible. In this case, the multiplexer 32 is provided with a further input, to which the data lines D8..D15 are connected. These data are also given a most significant bit 0 for identification as a data packet. Two data packets are always transmitted for transmission of data and are distributed to the data bus in the receiver by extension of the decoder 43 and doubling of the memory 45, in that the first packet always acts on the data line D0..D7, and the second on the data lines D8..D15. An extension to 32 bits can take place in a corresponding manner.

The invention is not limited to SCSI bus systems, but can also be applied, for example, to other bus systems in which an asynchronous mode and a synchronous mode are available for data transmission.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for coupling segments of a bus system having data and control lines by transmission of bit packets with a predetermined number of bits per packets, which number is less than a sum of the data and control lines, comprising the steps of:

providing an indicator in the bit packets to distinguish between data packets and control packets, data packets transmitting a status of the data lines and control packets transmitting a status of control lines;

forming a bus status from status changes of the status lines;

providing in the control packets an indicator which selects one of at least first and second transmission modes;

in a first transmission mode, receiving data packets and influencing with the received data packets only data lines;

in a second transmission mode, receiving data packets and influencing control lines, which are defined by the respective bus status, and also influencing the data lines.

2. The method as claimed in claim 1, wherein a control line is defined as a transfer signal by the bus status in the second transmission mode, and wherein reception of a data packet deactivates said transfer signal, acts on the data lines or rejects contents of the data packet as a function of the bus status and, thereafter, activates the transfer signal.

3. The method as claimed in claim 2, wherein reception of a control packet deactivates the transfer signal in the second transmission mode.

4. The method as claimed in claim 3, wherein a transmission device permits transmission of command packets in addition to data packets and control packets, and wherein a predetermined command packet is used instead of a control packet.

5. The method as claimed in claim 2, wherein transmission of the data packet is initiated by activation of the transfer signal on a bus segment of a transmitter, and wherein deactivation of the transfer signal, after a predetermined latency time period, effects transmission of a control packet if there is no renewed activation of the transfer signal within the latency time period.

6. The method as claimed in claim 5, wherein a transmission device permits transmission of command packets in addition to data packets and control packets, and wherein a predetermined command packet is used instead of a control packet.

7. The method as claimed in claim 1, wherein both a transfer signal and an acknowledgement signal are determined by the bus status, the transfer and acknowledgement signals being activated in various bus segments, and wherein the acknowledgement signal is transmitted in the same manner as the control signal, in an opposite direction.

8. The method as claimed in claim 1, wherein the Small Computer System Interface in accordance with ANSI X3.131-1986, ANSI X3T9.2 855D is used as the bus system.

9. The method as claimed in claim 1, wherein, the data lines of the bus system together have more bits than are capable of being transmitted in a data packet, and wherein the data is transmitted as a predetermined sequence of a fixed number of data packets, reception of a last of the fixed number of data packets being regarded as reception of a data packet.

10. The method as claimed in claim 1, wherein the bus system is a small computer system interface.

* * * * *